Dec. 18, 1956  B. B. BAUER  2,774,438
MECHANICAL DAMPING MEANS FOR THE DIAPHRAGMS
OF MICROPHONES, SPEAKERS, AND THE LIKE
Filed April 25, 1951
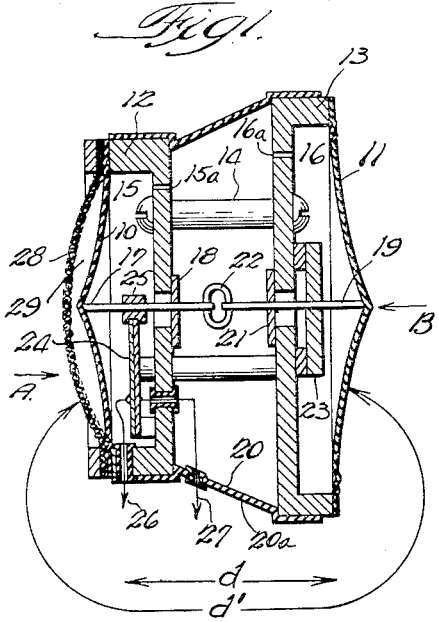
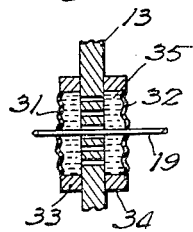
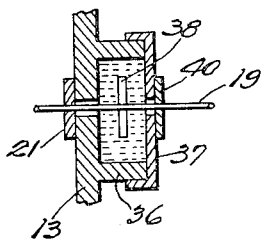
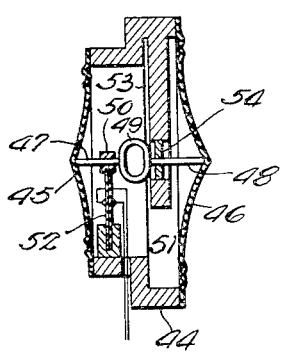
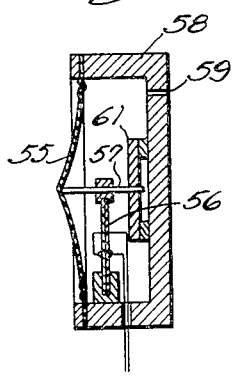
INVENTOR.
Benjamin B. Bauer United States Patent Office 2,774,438
Patented Dec. 18, 1956

2,774,438

MECHANICAL DAMPING MEANS FOR THE DIAPHRAGMS OF MICROPHONES, SPEAKERS, AND THE LIKE

Benjamin B. Bauer, Oak Park, Ill., assignor to Shure Brothers Incorporated, Chicago, Ill., a corporation of Illinois Application April 25, 1951, Serial No. 222,747

7 Claims. (Cl. 181—31)

This application is a continuation in part of the application Serial No. 754,798, Benjamin B. Bauer, filed June 16, 1947, now Patent No. 2,553,539, entitled Directional Microphone With a Compliant Link Interconnected Between the Two Diaphragms, and assigned to the same assignee as the present invention.

This application relates to damping means for the diaphragms of sound translating devices such as microphones, speakers and the like, more particularly to mechanical damping means, and it is an object of the invention to provide improved means of this character.

It has heretofore been suggested to damp the vibrations of the diaphragms of sound translating devices, especially microphones, by the motion of air through small holes, slits or other passages in rigid, for example, metallic, members. Such prior structures have required close spacing between the diaphragm and the rigid member in which the holes or slits are found in order to obtain the requisite damping effect. This has raised the problem during manufacture as to how the close spacing may be obtained without getting it so close that the small diaphragm movements are interferred with. Particularly is this true where, as in many instances, the diaphragms are curved in cross section. Techniques for reducing the number of faulty microphones due to such causes during manufacturing result in high cost and are difficult to carry out. Moreover, the damping properties of slits and the like through which air moves vary with the temperature and pressure.

Accordingly, it is a further object of the invention to provide improved mechanical damping means for the diaphragms of sound translating devices as indicated which are lower in cost, easy to make, constant in damping properties, and efficient in operation.

It is a further object of the invention to provide improved non-gaseous, viscous, fluid damping means for the diaphragms of sound translating devices as indicated.

It is a further object of the invention to provide liquid friction damping means for the diaphragms of sound translating devices as indicated.

It is a further object of the invention to provide semifluid damping means for the diaphragms of sound translating devices as indicated.

For a more complete understanding of the invention reference should be had to the accompanying drawing in which:

Figure 1 is a sectional elevational view of a microphone embodying the invention;

Fig. 2 is a fragmentary view in section of another embodiment of the invention;

Fig. 3 is a fragmentary view in section of a further embodiment of the invention;

Fig. 4 is a sectional elevational view similar to Fig. 1 of a modified form of the invention, and Fig. 5 is a sectional elevation view of a modified form of the invention.

Referring more particularly to the drawings, the invention is shown in Fig. 1 as comprising a directional microphone including a pair of diaphragms 10 and 11 adapted to vibrate and separated from each other by a distance $d$. The diaphragms may be made of any suitable material, such as thin aluminum or paper, for example, and are generally conical or curved in form so as to be relatively stiff whereby the diaphragms, in their movements, act largely as pistons. At their edges the diaphragms are resiliently supported and form the closures for casings 12 and 13 made of any sound impermeable material, casings 12 and 13 being separated from each other and relatively rigidly held together by means of spacers 14 thereby holding diaphragms 10 and 11 spaced apart. This spacing may vary and in some instances the spacers 14 may be eliminated to provide a common wall between casings 12 and 13. A circular case 20 may surround casings 12 and 13 to minimize perturbations of the sound field. Diaphragm 10 with casing 12, and diaphragm 11 with casing 13 define cavities or chambers 15 and 16 filled with air, diaphragm 11 being shown larger in area than diaphragm 10 to compensate for the stiffness of diaphragm 11. The case 20, as well as cavities 15 and 16, may be provided, if needed, with a small or high resistance vent 20a, 15a and 16a to the atmosphere to equalize the inside and outside pressure.

At the center or apex of diaphragm 10, a drive unit 17 is firmly attached by cementing, for example, the drive unit extending through an opening in the rear of casing 12, which opening is sealed by a seal 18 made of rubber, paper, or some other flexible material which will permit small mechanical vibrations of the drive unit without allowing sound waves to enter cavity 15. Similarly, a drive unit 19 is firmly attached to the center or apex of diaphragm 11, the drive unit extending through an opening in the rear of casing 13 which opening is sealed by a seal 21 also permitting small vibrations of the drive unit without permitting sound waves to enter cavity 16. The rear ends of drive units 17 and 19 are brought relatively close to each other and are joined by means of a compliant link 22 made of some springy material such, for example, as rubber, mechanical springs or one of the compounds known as elastomers. Consequently, diaphragms 10 and 11 are not rigidly but resiliently connected to each other, and vibrations of one diaphragm are transmitted to the other as modified in one respect by compliant link 22. Stationarily fixed to the rear of casing 13 within cavity 16 there is a damping or dissipative element 23 attached to drive unit 19 so as to move therewith and introduce a resistance to the motion thereof and, consequently, a damping of diaphragm 11, the dissipative element being made, for example, of the compounds known as elastomers. The block of damping material 23 is supported at its edges and the drive member 19 is attached thereto intermediate the edges. Consequently, the stress operating in the block of damping material is primarily shear. Many elastomers have the ability to absorb energy as well as springiness and hence may combine dissipation with compliance, examples of suitable elastomers being materials available as "Viscoloid" and "Flexiglass." Elastomers of this character have some characteristics of fluids and some characteristics of solids and may be termed semi-fluid solids. In the event that an elastomer is used for link 22, the diaphragms are coupled by an element having both compliance and dissipation and thus are coupled by an impedance.

In order to derive an electrical output from the movements of the diaphragms, a piezoelectric crystal 24 is mounted inside of cavity 15 and is relatively rigidly connected at one end through a collar 25 to drive unit 17 whereby movements of drive unit 17 produce deformations of the crystal with a resultant voltage output. Conductors 26 and 27 extending from crystal 24 lead outwardly through casing 12 for supplying the voltage generated to a suitable amplifier or other apparatus. Transducers other than piezoelectric elements may, of course, be used.

Spaced directly in front of diaphragm 10 is an acoustical screen 28 which may be constituted of a suitable wire screen support having one or more thicknesses of cloth thereon forming acoustical resistance and inertance, screen 28 being spaced from diaphragm 10 and defining therewith a cavity or volume 29.

Assuming that the structure of Fig. 1 is placed in air and sound waves approaching in the direction of the arrow A impinge thereon, the sound waves will come into contact with screen 28 and after a slight delay will contact diaphragm 10. At some instant later, determined by the effective distance $d'$ between screen 28 and diaphragm 11, and the sound frequency, the sound waves will come into contact with diaphragm 11. The effective distance $d'$ differs from the linear distance between screen 28 and diaphragm 11 because sound waves must bend around the barriers provided by the casings, the effective distance being greater. Because of this effect the sound wave pressures across the screen 28 and diaphragm 11 are not constant. Consequently, the effective distance $d'$ is equal to the distance $d$ plus an average or effective distance from the edges of the structure to the apex of diaphragm 11 and screen 28. In instances where the distance $d$ is relatively small compared to the diameters of the casings, the effective distance $d'$ may approximate three quarters of the distance from the center of screen 28 and the center of diaphragm 11. As the distance $d$ increases relative to the casing diameter, the effective distance approaches the center to center distance and becomes very nearly equal to it for large values of $d$. A sound wave, being in one aspect thereof a varying pressure wave traveling through the air, exerts varying pressure when it contacts the diaphragms, the sound pressure being converted into a mechanical force thereby. Sound pressure waves contacting diaphragm 10, after permeating the screen 28, will cause this diaphragm to exert a mechanical force on crystal 24, the phase of this force being determined by the resistance and inertance of screen 28 and the compliance of cavity 29, since the combined mass of the diaphragm and its drive unit, its mechanical resistance to movement or friction, the stiffness of the diaphragm mounting as well as the stiffness or resilience of the air within cavity 15 are sufficiently small compared to corresponding characteristics of the crystal that they may be considered part thereof. Sound pressure waves contacting diaphragm 11 exert a force thereon. This mechanical force is shifted in phase by the combined mass of diaphragm 11 and drive unit 19, its resistance to movement or friction, the stiffness of the diaphragm mounting, the stiffness of the air within cavity 16, the damping or resistance of dissipative element 23, and the compliance of link 22, link 22 serving to transmit a function of this force to crystal 24. The effects of seals 18 and 21 are made negligible.

The force acting on crystal 24, transmitted to it through collar 25, is the resultant of two forces. The first of these forces is that arising by virtue of sound waves falling upon diaphragm 10 through screen 28 and transmitted directly to crystal 24 through drive unit 17, and the second is a result of sound waves falling on diaphragm 11 and transmitted to drive unit 17 through compliant link 22, it being necessary to place the diaphragms in opposition so that the forces arising directly therefrom oppose each other. The force arising from diaphragm 11 is transmitted to crystal 24, only after having its phase shifted by a phase shift network including mechanical damping of element 23, the mechanical mass of diaphragm 11 and drive unit 19, the resilience (compliance) of the air within cavity 16, the resilience (compliance) of mounting of diaphragm 11, and the resilience of link 22.

Fig. 2 shows another manner of obtaining the dissipative effect producing damping of diaphragm 11 in order to obtain the necessary phase shift. In Fig. 2 the casing 13 is shown in fragmentary form together with drive unit 19, the drive unit being attached on each side of casing 13 to metallic diaphragms 31 and 32 by soldering or welding, for example. Diaphragms 31 and 32 are spaced from casing 13 by annular members 33 and 34 and cooperate therewith to define a chamber 35 filled with a suitable viscous substance such as a light oil or liquid silicone. The casing 13 between diaphragms 31 and 32 is provided with a number of small openings through which oil may flow. When the drive pin moves back and forth diaphragms 31 and 32 move therewith forcing the oil in chamber 35 to move back and forth through the openings in casing 13, thereby causing a dissipative action which provides the necessary damping component. The openings may be of any shape, so long as the requisite amount of resistance is provided, and may be straight or arcuate slits, for example.

In Fig. 3 another method of obtaining the requisite dissipative component is shown. The casing 13 is provided with a cylindrical portion 36 which is adapted to be closed by a cover 37 and flexible seals 21 and 40, chamber 36 being filled with petroleum, silicone jelly or a similar semi-solid substance. A disc 38 is attached to the drive unit 19 so that to-and-fro motions thereof produce to-and-fro motions of the disc in the jelly-like or grease-like substance and provides a satisfactory amount of dissipation for operation of the structure.

Another embodiment of my invention is illustrated in Fig. 4. In this embodiment the directional microphone comprises a casing 44 of sound-impermeable material having two portions thereof of different diameters, the smaller portion being closed by a diaphragm 45 and the larger portion being closed by a diaphragm 46 thereby to define a closed cylindrical chamber 51. Extending inwardly from the apex of diaphragm 45 and attached thereto is a drive unit 47, and extending inwardly from the apex of diaphragm 46 and attached thereto is a drive unit 48, the drive units being connected together by means of a compliant link 49 which may be made of a spring, rubber, or elastomer similar to compliant link 22. Supported within the casing 44 is a crystal 52 relatively rigidly connected to drive unit 47 by a collar 50 whereby movements of diaphragm 45 are communicated thereto. Extending inwardly from casing 44 is a relatively rigid member 53 adapted to hold a dissipative element 54 (an elastomer for example) which is connected to the drive unit 48 to damp the movements of diaphragm 46. The damping means of Figures 2 and 3 may of course, be incorporated into the structure of Fig. 4 in order to damp diaphragm 46.

The microphone of Fig. 4, while different in construction from, operates similarly to that of Fig. 1 in that the force arising from sound waves falling upon diaphragm 45 produces one force acting upon crystal 52 through drive unit 47, and the force arising from sound waves falling upon diaphragm 46 produces a second force transmitted to the crystal 52 through drive pin 48, the deformation of the crystal, and hence its output, being proportional to the resultant of the difference of these forces since the diaphragms oppose each other. The second force is made up of two parts, one of which is a force transmitted through link 49 and the other of which is a force resulting from the pressure transmitted through the air in cavity 51 and converted into a force at the underside of diaphragm 45.

The form of the invention shown in Fig. 5 is a non-directional microphone similar to the right-hand portion of Fig. 1 except that the piezoelectric element has been mounted inside of the casing. In Fig. 5 there is shown a diaphragm 55 connected to a transducer 56, for example, a piezoelectric element by means of a drive member 57, the drive member being attached to the apex of the diaphragm by cementing or other means in order that vibrations of the diaphragm will produce corresponding deformations of the piezoelectric element. Deformations of the piezoelectric element produce an electrical output through the conductors as is well understood. The diaphragm 55 closes a casing 58 inside of which the transducer 56 is mounted, the casing being vented by a high impedance or resistance vent 59 to equalize changes in air pressure due to atmospheric pressure changes. The casing 58 and the diaphragm 55 may be substantially identical to the diaphragm 11 and the casing 13 of Fig. 1. Attached to the inner end of drive member 57 is a block of damping material 61. The material 61 moves to and fro with vibrations of the diaphragm and having energy absorptive properties, the vibrations of the diaphragm are damped.

The damping means of Figs. 2 and 3 may, of course, be utilized in place of the block of damping material 61 of Fig. 5. In the instance of the damping means of Fig. 2, the chamber 35 with the flexible diaphragms 31 and 32 holding the liquid therein and that portion of the casing having the holes therethrough is mounted inside of casing 58 and the drive member 19 becomes drive member 57. Similarly, in the instance of the damping means of Fig. 3 the chamber 36 holding the jelly- or grease-like material with the vane 38 therein is mounted inside of casing 58 and the drive member 19 becomes drive member 57.

In each of the instances described, the damping means does not require close association with the diaphragm, the damping means being disposed in the relatively large space available inside of the microphone casing. The construction is thus easier and the cost is correspondingly reduced. The mechanical properties of the fluids are constant over a wide range of temperature and pressure conditions and thus the acoustic properties of the microphones or speakers remain constant over a wide range of conditions. Such apparatus would accordingly find usefulness in high as well as low altitudes.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a sound translating device including a diaphragm adapted to vibrate, energy-absorbing means for damping such diaphragm vibrations throughout the ordinary sound frequency spectrum comprising non-gaseous dissipative means, and means for connecting said diaphragm to such damping means including a rigid member attached to said diaphragm over a relatively small area thereof.

2. In a sound translating device including a diaphragm adapted to vibrate, energy-absorbing means for damping such diaphragm vibrations throughout the ordinary sound freqency spectrum comprising a semi-fluid solid medium means, and means for connecting said diaphragm to such damping means including a rigid member attached to said diaphragm over a relatively small area thereof.

3. In a sound translating device including a diaphragm adapted to vibrate, energy-absorbing means for damping such diaphragm vibrations throughout the ordinary sound frequency spectrum comprising a semi-fluid solid medium means, and means for connecting said diaphragm to said damping means including a rigid member attached to said diaphragm over a relatively small area thereof, said damping means being supported in said sound translating device and connected to said member so as to operate under shear stresses.

4. In a sound translating device including a diaphragm adapted to vibrate, energy-absorbing means for damping such diaphragm vibrations throughout the ordinary sound frequency spectrum comprising a relatively movable vane and viscous medium, and means for connecting said diaphragm to said damping means including a rigid member attached to said diaphragm over a relatively small area thereof.

5. In a sound translating device including a diaphragm adapted to vibrate, energy-absorbing means for damping such diaphragm vibrations throughout the ordinary sound frequency spectrum comprising means for effecting relative movement of a liquid and passage means, and means for connecting said diaphragm to such damping means including a rigid member attached to said diaphragm over a relatively small area thereof.

6. In a sound translating device including a diaphragm adapted to vibrate, energy-absorbing means for damping such diaphragm vibrations throughout the ordinary sound frequency spectrum comprising a chamber containing a liquid, a flexible wall on said chamber movable with the vibrations of said diaphragm, and a wall including passage means disposed in said chamber whereby movements of said flexible wall effect movement of said liquid through said passage means, and means for connecting said diaphragm to said flexible wall including a rigid member attached to said diaphragm over a relatively small area thereof.

7. In a sound translating device including a diaphragm adapted to vibrate, energy-absorbing means for damping such diaphragm vibrations throughout the ordinary sound frequency spectrum comprising a chamber containing a grease-like substance, a vane disposed in said chamber, and means for connecting said diaphragm to said vane including a rigid member attached to said diaphragm over a relatively small area thereof, whereby vibrations of said diaphragm effect relative movement of said vane and said grease-like substance.

References Cited in the file of this patent

UNITED STATES PATENTS

| | | |
|---|---|---|
| 231,247 | Watson | Aug. 17, 1880 |
| 751,501 | Gundlach | Feb. 9, 1904 |
| 1,551,105 | Hayes | Mar. 2, 1925 |
| 1,590,369 | Hahnemann | June 29, 1926 |
| 1,658,349 | Moore | Feb. 7, 1928 |
| 1,732,029 | Round | Oct. 15, 1929 |
| 1,847,935 | Farrand | Mar. 1, 1932 |
| 2,092,884 | Kendall | Sept. 14, 1937 |
| 2,198,424 | Baumzweiger | Nov. 4, 1937 |
| 2,280,763 | Hasbrouck | Mar. 30, 1940 |
| 2,305,598 | Bauer | Dec. 22, 1942 |
| 2,474,197 | Dimmick | June 21, 1949 |

FOREIGN PATENTS

| | | |
|---|---|---|
| 709,205 | France | May 11, 1931 |